June 24, 1958  L. C. H. JUY  2,839,939
CHANGE-SPEED GEAR

Filed June 7, 1955  5 Sheets-Sheet 3

June 24, 1958
L. C. H. JUY
2,839,939
CHANGE-SPEED GEAR
Filed June 7, 1955
5 Sheets-Sheet 4
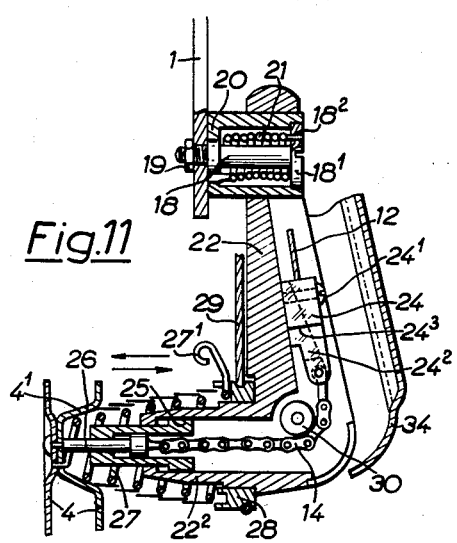
Fig.11
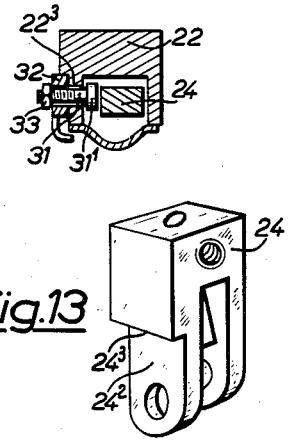
Fig.12
Fig.13
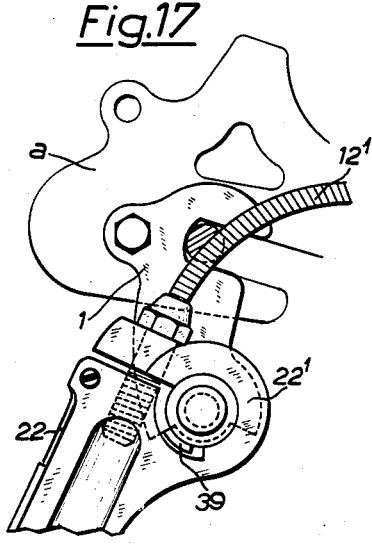
Fig.17
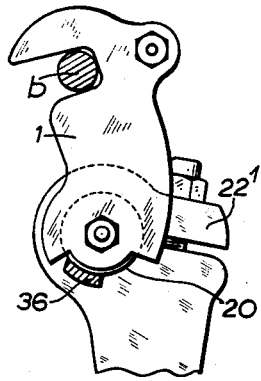
Fig.14

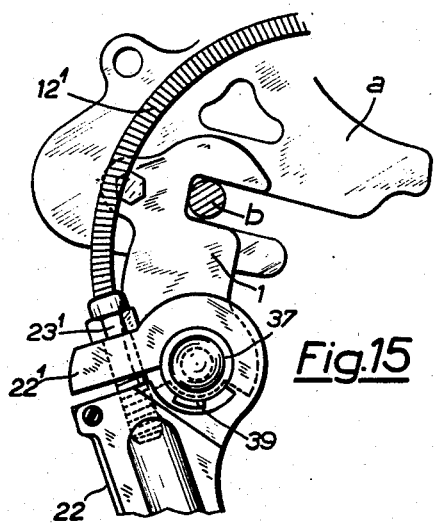
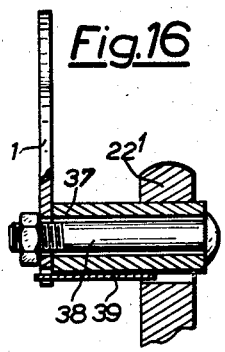
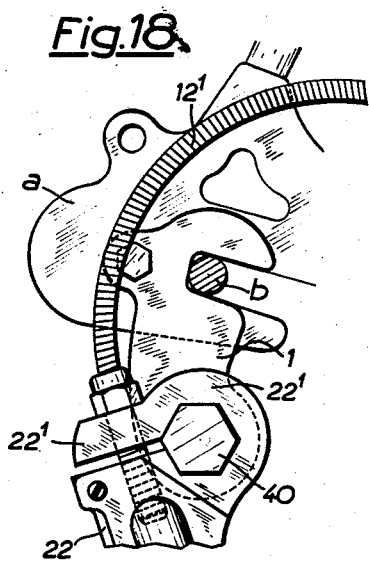
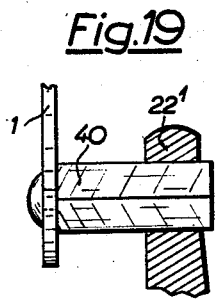

United States Patent Office 2,839,939
Patented June 24, 1958

2,839,939
CHANGE-SPEED GEAR
Lucien Charles Hippolyte Juy, Dijon, France
Application June 7, 1955, Serial No. 513,849
Claims priority, application France June 11, 1954
9 Claims. (Cl. 74—217)

The present invention relates to change-speed gear of the derailing type mechanisms for cycles and like vehicles. It is an object of the invention to provide such change-speed gear mechanisms in the form of a neat and compact assembly which is free from projecting and exposed parts such as are normally formed in the derailing type of the change-speed gear mechanisms known hitherto. It is also a further object to provide change-speed gear mechanisms which are covered and perfectly protected.

According to the invention there is provided a type change speed gear mechanism, comprising a carrying lever, at least a part of which is hollow, said lever being adapted to be adjustably mounted on a supporting lug formed integrally with or mounted on the frame of a cycle or the like vehicle, a selector member slidably mounted within the hollow part of the carrying lever, at least one reciprocating member associated with that end of said lever remote from the lug and arranged to move relatively to the latter in a direction substantially perpendicular thereto, said reciprocating member being provided with means to guide a driving chain and to move said chain transversely into alignment with any one of a plurality of driving sprockets, spring means urging said reciprocating member in a direction away from the plane of the carrying lever, a chain or the like flexible means connecting the reciprocating member to the selector member, and a control cable attached to said selector member and adapted to position the same relatively to the carrying lever and consequently to position the means serving to guide the chain so that the latter is in alignment with a selected sprocket.

In order that the said invention may be clearly understood and readily carried into effect the same will now be more fully described with reference to the accompanying drawings which show several embodiments by way of example and in which:

Fig. 11 is a sectional view of the change-speed gear mechanism along the line 11—11 of Fig. 9.

Fig. 12 is a sectional plan view along the line 12—12 of Fig. 9.

Fig. 13 shows in perspective a sliding attachment member adapted to join the control cable and the small chain or other flexible traction member on the reciprocating axis.

Fig. 14 is a side view of a part of the change-speed gear mechanism along the line 14—14 of Fig. 10.

Fig. 15 is a side elevational view illustrating a simplified embodiment of the articulation of the lever carrying the change-speed gear mechanism.

Fig. 16 is a sectional view of the construction shown in Fig. 15.

Fig. 17 illustrates a rear pivoting position of the lever shown in Fig. 15.

Fig. 18 is a side elevational view illustrating a second simplified embodiment of the articulation of the lever carrying the change-speed gear.

Fig. 19 is a sectional view of the construction shown in Fig. 18.

Figure 1:
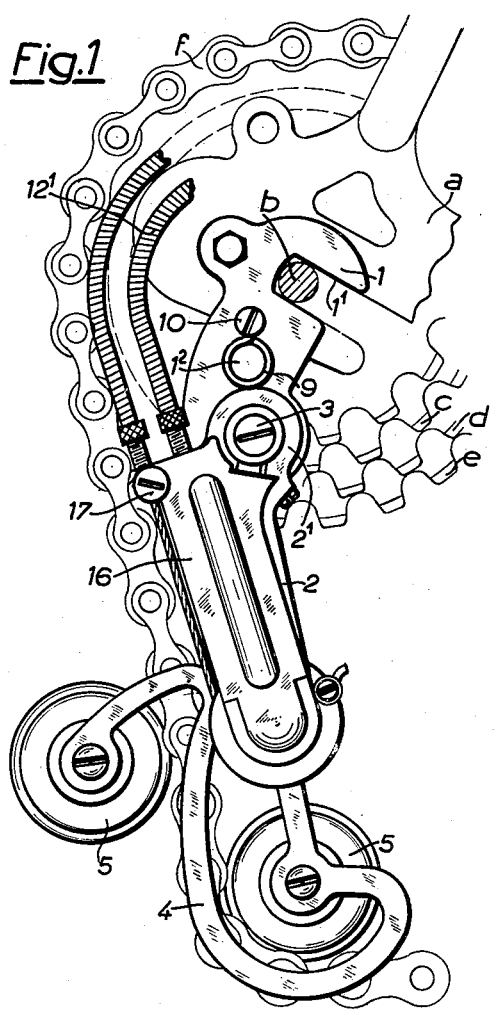
Fig. 1 is a side elevational view of one form of change-speed gear mechanism which is shown mounted on the rear lug of a cycle frame, the normal stepped sprockets on the hub of the rear wheel of the cycle being indicated in broken lines.

Referring now to the drawings 1 denotes a lug which carries the change-speed gear mechanism and serves to attach same to the rear lug $a$ of a cycle frame.

The lug 1 has an open slot $1^1$ corresponding to the open slot in the lug $a$ of the frame. The base of the slot $1^1$ can serve as a constant positioning abutment for the axle $b$ of the cycle wheel. The hub of the wheel carries, in the usual manner, several sprockets of different diameters, for examples, $c$, $d$, $e$ (shown in broken line in Figs. 1—2 and 9—10), the chain which transmits the driving power running round these sprockets.

Figure 2:
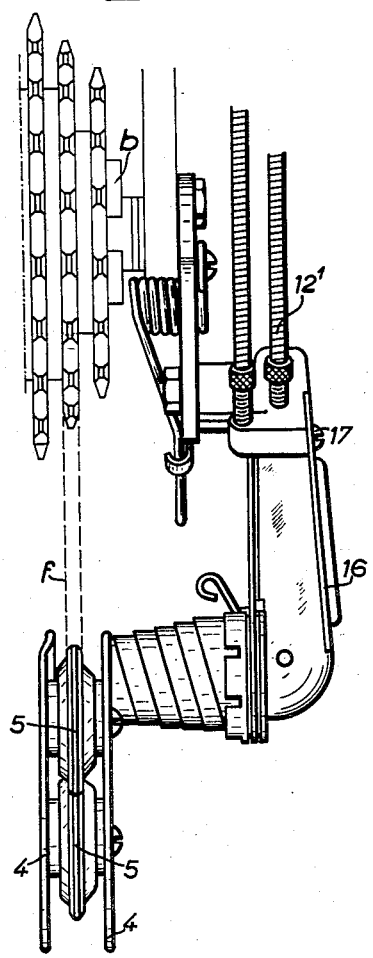
Fig. 2 is a rear view of the mechanism shown in Fig. 1, the stepped sprockets being again shown in broken lines.
Figure 3:
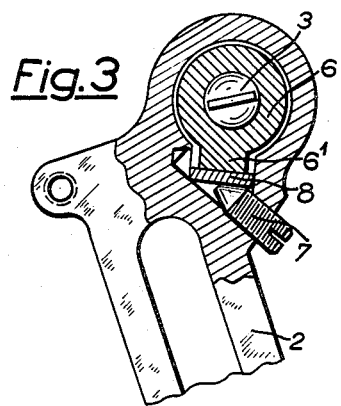
Fig. 3 is a section on a larger scale of a lever serving to support the change-speed gear mechanism on the supporting lug.

The change-speed gear mechanism according to the invention comprises, in addition to the supporting lug 1, a carrying lever 2 pivotably mounted on an axle 3 carried by the lug 1 (Figs. 1 and 2). Resilient means comprising a spring is interposed between the supporting lug 1 and the carrying lever 2 in order to exert on the latter a permanent pivoting force about the axle 3, in a clockwise direction as seen in Fig. 1.

The other end of the lever 2 carries a reciprocating device as illustrated in section in Fig. 11. The free end of the reciprocating device carries two cheeks 4 between which is guided the chain of the cycle which runs round one of the sprockets $c$, $d$, $e$. Freely rotating rollers 5 serving as a rotating support for the chain $f$ of the cycle (shown in broken line in Figures 2 and 10) are mounted between the cheeks 4.

The lever 2 is made in the form of a hollow member of cast or stamped metal, or in accordance with any other known process, with a view to receiving and protecting the transmitting end of the reciprocating mechanism.

In the embodiment illustrated in Figs. 1 to 8, the carrying lever 2 is attached to the axle 3, in such a manner as to be adjustable transversely in order to displace and to position the whole of the change-speed gear mechanism in relation to the sprockets $c$, $d$, $e$ on the hub of the cycle wheel.

For this purpose the upper part of the lever 2 has a bearing $2^1$ which is pivotably engaged with the axle 3 by means of a ring 6. The said ring 6 is so mounted on the axle 3, that while it is freely rotatable it cannot be displaced axially on said axle. The angular position of the lever 2 relatively to the ring 6 is determined by a key $6^1$ carried by the ring 6. The key $6^1$ matches a corresponding keyway in the lever 2. The lever 2 is fixed in the transverse position after adjustment by means of a screw 7 having a conical end, said screw being threaded into the lever 2, and serving to hold a locking plate 8 against the key $6^1$.

The system for applying resilient pressure to the carrying lever 2 consists of a spring 9 wound round an axis $1^2$ on the lug 1. One end of the spring is attached to the lug 1 by means of a screw 10, or any other suitable device. The other end $9^1$ of the spring exerts a pivoting force either directly against the lever 2 or, as shown in the drawing, against a hook-like projection $8^1$ which forms an extension of the locking plate 8. Alternatively the end $9^1$ of the spring may co-operate with an abutment or the like on the ring 6. In any case the ring 6 and the lever 2 are spring urged.

Figure 8:
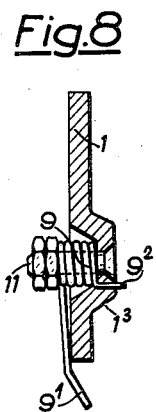
Fig. 8 shows a constructional detail and illustrating the mounting of the spring which exerts a permanent pivoting pressure on the lever carrying the change-speed gear mechanism.
Figure 9:
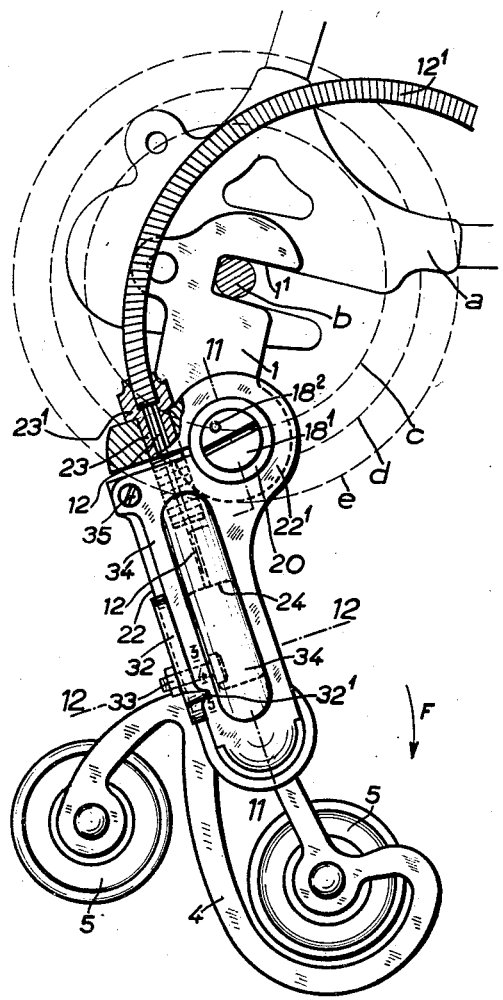
Fig. 9 is a part sectional side elevation of a second embodiment of the change-speed gear mechanism which is also shown mounted on the rear lug of a cycle frame, the normal stepped sprockets on the hub of the rear wheel of the cycle being shown in broken line.
Figure 10:
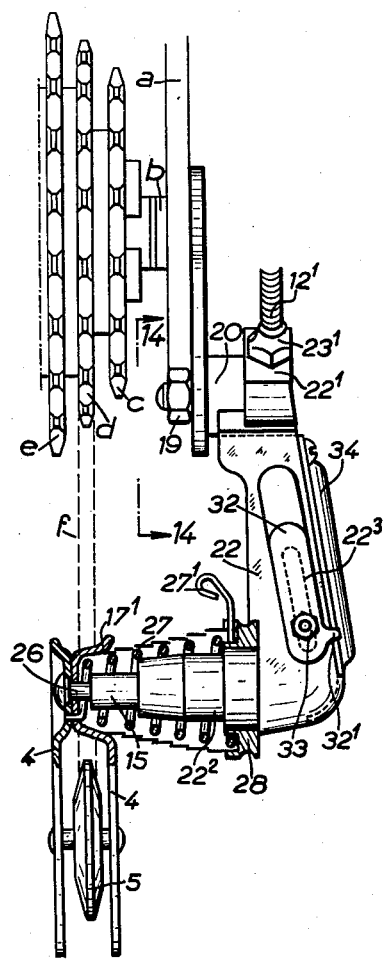
Fig. 10 is an end view of the assembly shown in Fig. 9, the stepped sprockets again being indicated in broken lines.

In another embodiment illustrated in Figure 8, the supporting lug 1 has formed therein a boss $1^3$ which boss contains the major part of the spring 9 wound round a rod 11. The fixed end $9^2$ of the spring is positioned by engagement in a hole in the boss $1^3$.

Gear-changing is effected by a cable 12, which is, moreover, actuated by a lever or any other known means which there is no need to show or to describe.

Figure 4:
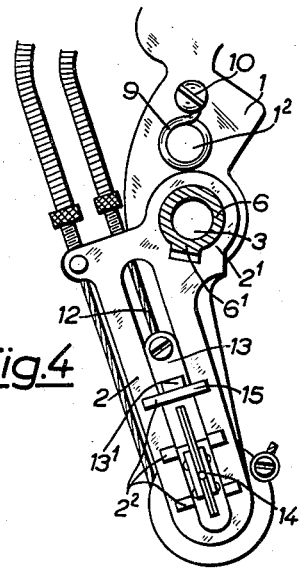
Fig. 4 illustrates the lever carrying the change-speed gear mechanism, with the cover-plate removed in order to show the internal mechanism for adjusting the amount of displacement of the reciprocating system as a function of the number of sprockets on the wheel hub.
Figure 5:
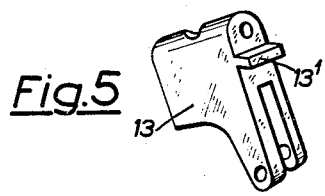
Fig. 5 shows in perspective one embodiment of a selector member.
Figure 6:
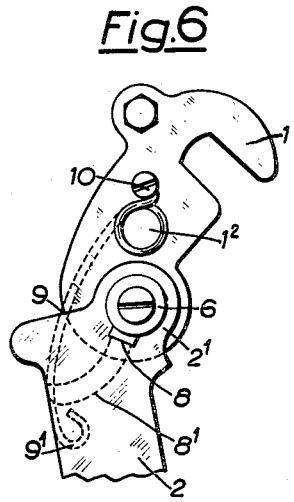
Figs. 6 and 7 are further side and end elevational views respectively of the lever carrying the change-speed gear mechanism.
Figure 7:
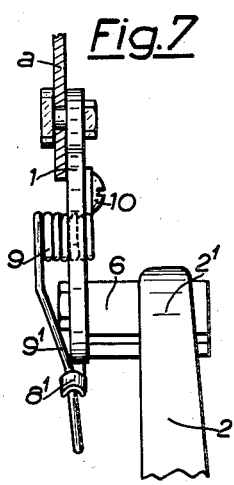

The cable 12 ends in the hollow part of the lever 2, where it is fixed by a screw or other means on a selector member 13 (Figs. 4 and 5). The member 13 is slidably mounted in the hollow part of the lever 2. Furthermore, the end of a small chain 14 or other flexible transmission member is hingedly connected to the member 13, said transmission member extending as far as the reciprocating member carrying the cheeks 4 and the rollers 5. This assembly and the mounting of the reciprocating members and the cheeks on the reciprocating axis conform to the assembly and mounting described hereinafter with reference to Fig. 11.

The selector member 13 has a small projecting transverse tongue $13^1$ which is held by a small bar 15 engaged in one of a series of pairs of notches $2^2$ formed internally of the carrying lever 2 (Fig. 4). Locating the small bar 15 in one pair of the notches $2^2$ adjusts the amount by which the member 13 can slide, and consequently the amount of the displacement of the tensioning lever formed by the cheeks 4 with the rollers 5, according to whether three sprockets c, d, e, four sprockets or five sprockets are used.

The mechanism thus mounted in the carrying lever 2 is protected by a cover-plate 16 which is attached to the said lever for example by a screw 17. Alternatively the cover plate may be sprung into position or secured in any other known manner. The whole thus has a neat appearance, and the members are well protected.

In another embodiment of the change-speed gear mechanism, illustrated in Figs. 9 to 14, the lug 1 has a pivot 18 at its lower end, said pivot having a slotted head $18^1$, and being locked on to the said lug between a collar formed on the pivot and a nut 19. A hollow cylindrical bush 20 is mounted so as to be able to rotate freely about the pivot 18, upon which the said bush is held by the head $18^1$ of the pivot. A helical spring 21 is disposed between the pivot and the bush 20. One end of the spring 21 is engaged and positioned in a hole $18^2$ in the slotted head $18^1$ of the pivot, while the other end of the spring is engaged and positioned in a hole in the bush 20.

The carrying lever 22 is similar to that described with reference to Figs. 1 to 8. However, the upper part of the lever 22 is so formed as to constitute a split collar $22^1$, fixable on the bush 20; after adjustment of the transverse position of the lever 22, the collar $22^1$ is locked by a screw 23 which is threaded into the body of the lever 22, the head $23^1$ of said screw abutting against the upper part of the collar.

The head $23^1$ of the screw 23 is recessed to receive the sheathing $12^1$ of the cable 12. The cable 12 extends axially through the screw 23, which is apertured for this purpose, and is disposed internally of the hollow lever 22 for the purpose of being fixed by a screw $24^1$ to a movable member 24 which is coupled to the small chain 14. The cross-section in Fig. 12 illustrates the hollow part of the lever 22 in which the member 24 can slide, said member being formed, for example, as illustrated in Fig. 13.

The lowered cranked part of the lever 22 has a sleeve-like bearing $22^2$, disposed perpendicularly in relation to the body of the lever. An element 25 (as shown in the drawing, Fig. 11) or several elements are mounted to slide telescopically in the bore of the bearing $22^2$. The final element of the telescopic assembly is formed by the pin 26, to the outside end of which are attached, by brazing, screwing, riveting or other known means of attachment, the cheeks 4 which guide the cycle chain.

The dished shape part $4^1$ of the cheek 4 nearer to the lever 22 allows on the one hand a reduction in the transverse space taken up by the change-speed gear, and, on the other hand, it allows the end of a helical spring 27 to be centred and supported. The other end of the spring 27 is centred and supported in the circular groove formed in a pulley 28 which is rotatably mounted on the bearing $22^2$ of the lever, against the lever 22. The end $27^1$ of the spring is radially engaged in a notch in the pulley 28, and remains fast therewith during operation, while the other end of the spring is supported and positioned in a hole pierced in the cheeks 4 at the base of the dished part $4^1$ (Fig. 11).

The spring 27 has a double function: On the one hand it is compressed between the pulley 28 and the cheeks 4, and ensures a return pressure which tends to move the cheeks and rollers away from the lever 22, and, on the other hand, it is fitted with a certain torsion or circular tension, and tends to cause the cheeks and rollers to pivot in a clockwise direction (arrow F, Fig. 9). The circular tension of the spring 27 is kept constant on the chain by the play of the rotating pulley 28, which drives the end $27^1$ of the spring 27. The rotation of the pulley 28 is effected by a cable 29 wound round the said pulley, the displacement of which is controlled directly by the user in accordance with the chain tension desired. Alternatively the rotation of the pulley 28 may be controlled in synchronism with the displacement of the cable 12, which displaces the reciprocating system with the cheeks 4 and the rollers 5.

The pin 26 of the movable telescopic reciprocating system has a head to which is attached the end of the small chain 14 of which the other end is connected in articulated manner to a pair of lugs $24^2$ in the selector member 24. Any other flexible member can be used for connecting the selector member 24 to the pin 26. A roller 30 so fitted as to rotate freely in the hollow part of the lever 22 serves as a means for supporting and guiding the small chain 14.

In accordance with the number of sprockets carried by the wheel hub (three sprockets c, d, e, as shown in the drawing, or four or five sprockets), the amount of transverse displacement of the reciprocating device with the cheeks 4 and the rollers 5 has to vary, while being limited in each case. For this purpose, the selector member 24 has a lateral stepped shoulder $24^3$ intended to abut against a stop which limits the amount by which it can slide in the lever 22. This stop is formed by the head $31^1$ of a threaded rod 31 which traverses a slot $22^3$ formed in a side wall of the hollow part of the lever 22 and also traverses a plate 32 which can slide on one lateral face of the lever 22. The plate 32 is intended to mask the slot 22³ whatever the position of adjustment of the rod 31. A nut 33 serves to lock the rod 31 with the head 31¹ in any selected position of adjustment. The plate 32 may, as shown, have a cranked finger 32¹, which is adapted to co-operate with a scale marked on the cover-plate 34 fitted to the front face of the lever 22 and secured in position by crimping, force fit, by a screw 35 or by a combination of these means. The mechanism fitted in the lever 22 is thus perfectly protected.

The amount by which the carrying lever 22 can be pivoted is limited in both directions by virtue of the provision of a plate 36, in the form of a sector fast with the bush 20. The plate 36 projects axially of the bush 20 and into the plane of the lug 1 which is formed with a cutaway portion of sector shape in order to accommodate said plate 36, the ends of this cutaway portion serving as abutment means for the plate 36 and the pivoting assembly (Fig. 14).

Following this description, the functioning and the advantages of this change-speed gear mechanism will be evident. In particular the articulated mounting of the lever 22 and the bush 20. The resilient pressure system acting on the lever 22 is entirely covered and protected and the whole, and particularly the rollers 5, can be rapidly adjusted in relation to one of the end sprockets on the wheel hub. This adjustment is made easy and convenient by the fact that the upper part of the carrying lever 22 is made in the form of a collar. The device 31, 32 which adjusts the amount of the displacement of the telescopic reciprocating system is also effective, convenient and simple. The same applies to the device intended to limit the amount of pivoting of the lever 22 and the whole mechanism.

Figs. 15 and 16 illustrate a simplified embodiment of the pivotal mechanism of the carrying lever 22. This pivotal mechanism comprises a bush 37 which is secured to the lug 1 supporting the change-speed gear mechanism by a bolt 38 having a nut. The collar-shaped part of the lever 22 is so mounted as previously described on the bush 37, the axial adjustment thereof will be possible. A plate 39 is fixedly screwed on the bush 37 and also relatively to the lever 22 in such a way as to provide two principal angular limiting positions of the lever 22, said plate being adapted to co-operate with a sector shaped recess formed in the lug 1, in such a manner as to provide a normal operating position (Fig. 15) and a position pivoted rearwards (Fig. 17) which facilitates the fitting and removal of the wheel for repairs.

In this embodiment the lever 22 is not fitted so as to pivot resiliently during operation. It is fixed in a predetermined angular position. A spring is no longer fitted in the axis 37. Construction is simplified, more economical and lighter. Chain tension is then ensured solely by the spring 27 in the reciprocating device.

Another embodiment, which is still further simplified, is illustrated in Figs. 18 and 19. In this case an axle 40 of polygonal cross-section (hexagonal for example) is attached by brazing, riveting, screwing or other means to the supporting lug 1. The collar present at the upper part of the lever 22, is locked on the axle 40, after transverse adjustment. It should be understood that the aperture in the collar of the lever is of a form corresponding to the cross-section of the axle 40. It is thus possible to provide well-determined different angular positions for the lever 22. Without departing from the scope of the invention, it is possible to make the axle fast with the supporting lug 1, and to provide the same with grooves, notches or other means formed in accordance with the generatrices of the axle, the aperture in the collar being formed to co-operate therewith.

It may be pointed out here that in all embodiments the supporting lug 1 can be omitted and replaced by an extension brazed to the lug a of the frame or directly formed by the said lug of the frame.

I claim:

1. A change speed gear mechanism for a cycle, comprising a plurality of sprocket wheels of different diameters adapted to be rigidly mounted on a rear wheel axle of the cycle and axially aligned therewith, a supporting lug, means attaching one end of said lug to a part of the cycle frame, a carrying lever device hollow in construction and L-shaped in form, the leg of the L being connected to the opposite end of said lug, the base of the L being adjustable in length and connected at its end to a guide member, at least one roller rotatably connected to said guide member for supporting and guiding a drive chain for the cycle, means for adjusting the length of the base portion of said carrying lever so that said roller may be aligned with respective ones of said sprocket wheels, said adjusting means comprising a selector member adapted to slide in the hollow leg portion of said carrying lever, a hand manipulative cable connected to one end of said selector member, a telescoping housing member enclosing the base of said carrying lever and mounted between said guide member and the leg of said carrying lever, means enclosed by said housing member for adjustably tensioning said guide member relative to said carrying lever, means manually controlling the axial length of said adjustable tensioning means, force transmission means connected to the opposite end of said selector member and to said guide member, whereby longitudinal movement of said cable correspondingly moves said guide member, and means for stopping said selector member at positions where the roller is aligned with respective ones of said sprocket wheels, whereby the transverse displacement of the base of said carrying lever is controllable by said selector member and said adjustable tensioning means.

2. The mechanism according to claim 1, and further comprising a spring mounted on said lug for applying a force to said carrying lever tending to pivot said guide member away from said sprocket wheels, whereby the drive chain engaging a sprocket wheel and passing over said roller is held in tension by the action of said spring.

3. The mechanism according to claim 1 wherein said tensioning means enclosed by said housing comprises a helical spring rigidly connected at one end to said guide member and connected at the opposite end to a rotatable pulley, and said means controlling the axial length of said tensioning means comprises a hand manipulative cable fastened at one end to said pulley and wound therearound a sufficient number of times so that longitudinal movement of said cable rotates said pulley.

4. The mechanism according to claim 1, wherein the base of said carrying lever further comprises a hollow axial member telescoping in the hollow portion of the carrying lever, said force transmitting means passing through said axial member and having means telescopically moveable therein, whereby the adjustability of the length of said base portion is determined predominantly by the dual telescoping arrangement.

5. The mechanism according to claim 1, and further comprising a second roller connected to said guide member, said rollers being positioned so that the drive chain passes therebetween.

6. The mechanism according to claim 1, wherein said carrying lever is pivotally connected to said lug by means of an axle attached to said lug, a bush on said carrying lever pivotally mounted on said axle, and means fixing the transverse position of said carrying lever on said axle.

7. The change speed gear mechanism as claimed in claim 1, wherein said means for stopping said selector member comprises a bar, adapted to be selectively mounted in any one of a plurality of notches formed in the leg portion of said carrying lever, said bar extending into the path of said slidably mounted selector member.

8. The change speed gear mechanism as claimed in claim 1, wherein said means for stopping said selector member comprises a rod provided with an abutment for the selector member, said rod being adjustably mounted in a slot in the carrying lever.

9. The change speed gear mechanism as claimed in claim 1, wherein said rod is screw threaded at least on its outer end and is fixed in selected position on the carrying lever by a nut, said nut also serving to support a plate adapted to cover said slot and provided with indicating means.

References Cited in the file of this patent

UNITED STATES PATENTS

| | | |
|---|---|---|
| 2,010,248 | Winkler | Aug. 6, 1935 |
| 2,187,368 | Todrys | Apr. 1, 1948 |

FOREIGN PATENTS

| | | |
|---|---|---|
| 444,999 | Great Britain | Apr. 1, 1936 |
| 399,800 | Italy | Nov. 13, 1942 |
| 405,756 | Italy | Sept. 6, 1943 |
| 432,941 | Italy | Apr. 1, 1948 |
| 664,186 | Great Britain | Jan. 2, 1952 |
| 684,211 | Great Britain | Dec. 10, 1952 |
| 1,048,895 | France | Aug. 12, 1953 |
| 904,385 | Germany | Feb. 18, 1954 |